Feb. 8, 1949.　　　　J. W. HEASTON　　　　2,461,273
CRANKPIN REPLACEMENT BEARING CONSTRUCTION
Filed Jan. 30, 1945
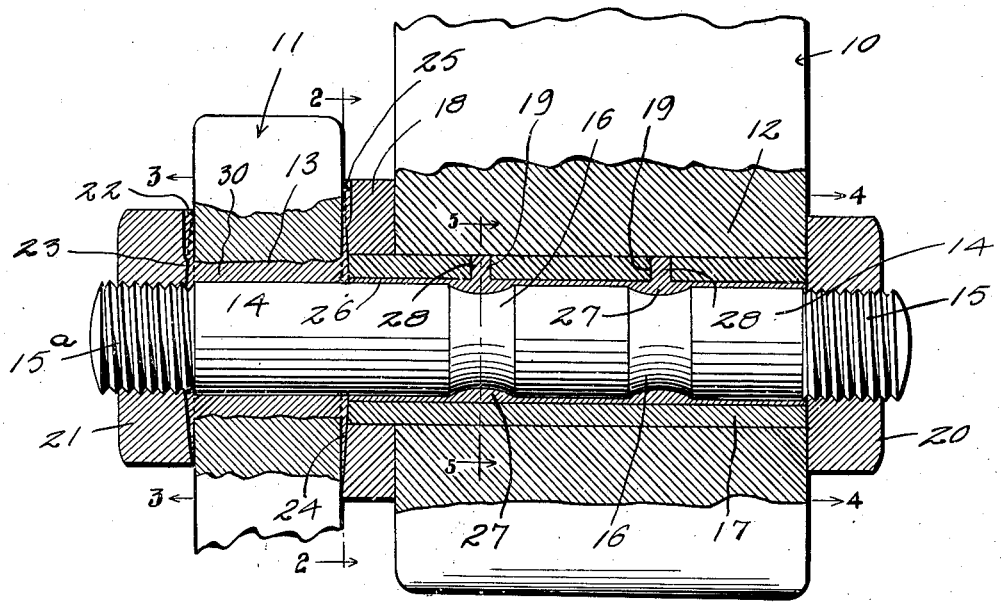
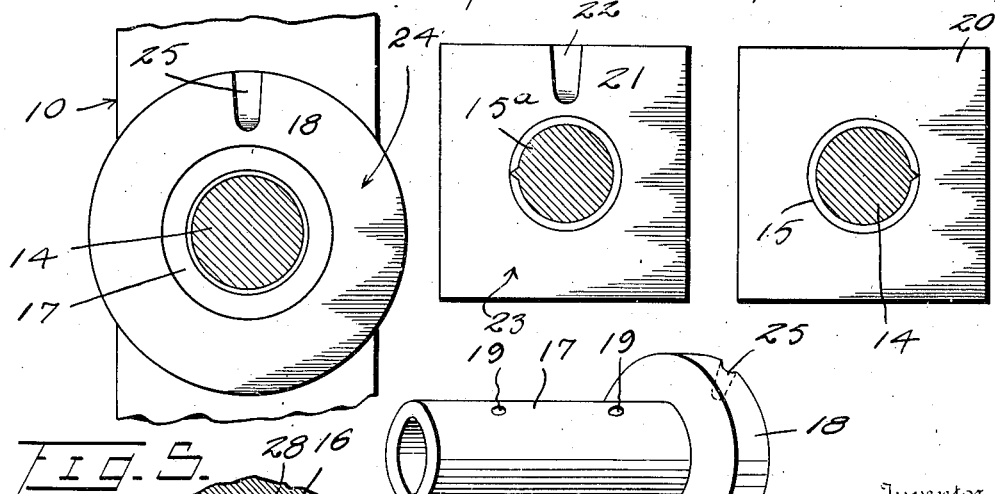
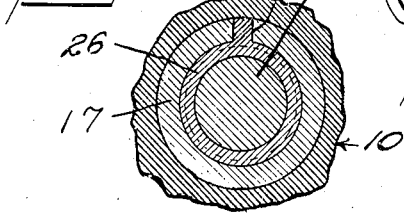
Inventor
J. W. Heaston
By Bryant + Lowry
Attorneys Patented Feb. 8, 1949

2,461,273

UNITED STATES PATENT OFFICE 2,461,273

CRANKPIN REPLACEMENT BEARING CONSTRUCTION

John W. Heaston, Huntington Beach, Calif.

Application January 30, 1945, Serial No. 575,302

4 Claims. (Cl. 74—598)

This invention relates to machine elements and more particularly to replacement crank pins designed to be set in worn crank pin bearings.

In certain types of machines such, for example, as oil pumps, the crank arms become badly worn in the pin bearings, so that the installation of a new crank pin of the same type as the removed worn one, is not feasible since a snug fit of the pin in the crank opening could not be obtained.

The present invention has for its object to provide a replacement pin unit which can be installed in such worn crank arm opening with suitable metal babbitted in to form an integral connection between the pin and the crank arm which it couples together.

Another object of the present invention is to provide a replacement crank pin for the purpose stated in which securing nuts, threaded upon the ends of the pin to maintain the pin in place, are formed in a novel manner to facilitate pouring bearing metal in around the pin after it has been set in the work crank arm openings.

The invention will be best understood from a consideration of the following detailed description taken in connection with the accompanying drawing forming a part of the specification, with the understanding, however, that the invention is not confined to a strict conformity with the showing of the drawing but may be changed or modified, so long as such changes or modifications mark no material departure from the salient features of the invention as expressed in the appended claims.

In the drawing:

Figure 1 illustrates the application of the invention to the crank arm and pitman of an oil pump.

Figure 2 is a section taken on line 2—2 of Figure 1.

Figure 3 is a section taken on line 3—3 of Figure 1.

Figure 4 is a section taken on line 4—4 of Figure 1.

Figure 5 is a fragmentary section taken on line 5—5 of Figure 1.

Figure 6 is a view in perspective of the bearing sleeve encircling the pin.

Referring now more particularly to the drawing the numerals 10 and 11 designate, respectively, the pitman and crank arm of an oil pump in connection with which the present invention is particularly designed for use, although it is to be understood that it is not to be confined to such use, but may be used wherever it is found applicable.

The numerals 12 and 13 designate, respectively, the worn bearing openings of the pitman 10 and crank arm 11.

In accordance with the present invention there is provided the pin 14 which is threaded upon its two ends as at 15 and 15a, and which has formed therearound adjacent one end the encircling channels 16 within the normal bearing zone of the pitman 10.

The numeral 17 designates a bearing sleeve which is of slightly greater internal diameter than the diameter of the pin 14, and has fastened on one end the collar 18, while spaced alined openings 19 are formed through the sleeve for purposes presently to appear.

The numerals 20 and 21 designate nuts to be threaded upon the ends 15 and 15a of the pin and the nut 21 has a channel cut in its inner face from the outside thereof as indicated at 22, while the face of the nut 21 is hollow ground, as indicated at 23.

The outer face of the collar 18, together with the end of the sleeve adjacent thereto, is also hollow ground as indicated at 24, and these ground out faces 23 and 24 are in opposition but separated by the crank arm 11, being located respectively on opposite sides of such arm with the hollow ground faces each opposing a face of the arm, when the pin is installed for the purpose hereinafter set forth. The collar 18 has a slot or channel 25 in the hollow ground face thereof adjacent its outer edge.

In setting up the pin for use, the portion of the pin having the encircling channels 16 therein, is inserted into the collar end of the sleeve to the point where, when the sleeve is introduced into the bearing opening 12 of the pitman 10 and the nut 20 applied to the pin, the nut when drawn up will be tight or snug against the end of the sleeve and the collar is thus brought in alinement with the crank arm as it is shown in Figure 1.

The outer surface of the sleeve acts as a bearing for the pin in the pitman bearing opening.

When the sleeve is so positioned on the pin, with the nut 20 threaded on the end 15 of the pin into engagement with the sleeve 17, molten metal 26 is poured into the sleeve through the openings 19, so that all of the space between the pin and sleeve is uniformly filled. This metal forms ribs 27 within the channels 16, and these, together with the part of the metal which fills the openings 19 as indicated at 28, lock the sleeve against endwise movement on the pin and provide a rigid structure.

After the filling metal has set, the nut 20 is removed and the sleeve and pin, which together may generally be defined as the bearing pin, are then inserted into the opening 12 of the pitman 10, and the nut 20 is re-applied and drawn up tight against the end of the pin and the pitman, as shown.

The crank arm 11 is then put into place on the end 15a of the pin which remains extending beyond the collar 18. The side of the crank arm is brought to bear against the hollow ground face 24 of the collar and the nut 21 is then threaded onto the pin end 15a, and the hollow ground face of this nut is tightened up against the outer side of the crank arm.

Molten metal 30 is poured into the space between the wall of the opening 13 of the crank arm, and the pin 14, through the channel 22 of the nut 21, and also through the channel 25 of the collar 18. This causes the spaces between the hollow ground faces of the nut and collar to be filled, together with the worn opening 13 external of the pin. Thus the end of the pin 14, beyond the collar, and the crank arm, together with sleeve 17, are tightly bonded together so that as the arms move the coupling pin and the crank arm turn together. It will be understood that the molten metal forms a bond between the pin 14, crank arm 11, nut 21 and the sleeve 17, to produce a unitary structure with only the pitman having movement relatively to all of the foregoing elements. As will be understood, should tightness be present between the pitman and the collar 18 and nut 20 sufficient to prevent relative movement between the pitman and sleeve 17, suitable floating washers (not shown) may be interposed between the pitman and the collar and nut in a well-known manner.

From the foregoing it will be readily apparent that the present invention provides a simple, efficient bearing pin for a replacement when the regular bearing pin and the bearing openings in the crank arms of a pump or similar device become worn beyond further usefulness, such replacement being easy to install and maintaining the arms in proper and accurate working relation.

I claim:

1. In means for restoring the operative relationship between a pitman and its co-operating crank arm and crank pin ensemble in presence of worn conditions within the ensemble, the combination with the pitman and crank arm, of an assemblage operative to function as a crank-pin having a rigid connection with the crank arm and rotatable relative to the pitman, said assemblage including an elongated member extending through axially alined openings of the pitman and crank arm with the diameter of the member less than that of the respective openings and with the end zones of the member extending beyond the crank arm and pitman openings and threaded for receiving nuts for retaining the ensemble in operative relation, and an annular element carried by and anchored to the member and freely rotatable within and relative to the pitman, an end zone of the element having a collar constituting a spacing member for the pitman and crank-arm, said crank arm nut and said collar each being formed to permit location of an anchoring medium of fusible type between the nut, collar, elongated member and the crank arm to thereby anchor the crank arm to said elongated member.

2. An assemblage as in claim 1 characterized in that the faces of nut and collar co-operating with the crank arm are each hollow-ground, and formed with an opening leading from an external face to such face to thereby permit ready access of the anchoring medium in fusible form to the space between the elongated member and wall of the worn opening of the crank arm and such hollow-ground faces with the solidified medium providing a locking-key between the crank arm, the nut, the collar and the elongated member.

3. An assemblage as in claim 1 characterized in that the internal diameter of the element is greater than the external diameter of the elongated member with the element including radial openings to receive the fusible anchoring means and to provide the means in solidified form as an anchoring formation between the member and element.

4. An assemblage as in claim 1 characterized in that the internal diameter of the element is greater than the external diameter of the elongated member with the latter peripherally grooved and with the element including radial openings registering with the grooves to receive the fusible anchoring means and to provide the means in solidified form as an anchoring formation between the member and the element and operative to prevent endwise movement of the element on the member.

JOHN W. HEASTON.

REFERENCES CITED

The following references are of record in the file of this patent:

UNITED STATES PATENTS

| Number | Name | Date |
|---|---|---|
| 656,718 | Fletcher | Aug. 28, 1900 |
| 1,498,769 | Wood | June 24, 1924 |
| 1,549,218 | Raym | Aug. 11, 1925 |
| 1,589,004 | Stone | June 15, 1926 |